(12) United States Patent  
Arduini

(10) Patent No.: US 8,985,583 B2  
(45) Date of Patent: Mar. 24, 2015

(54) NON-TRIVIA GAME AND METHOD OF PLAY

(75) Inventor: Douglas P. Arduini, San Ramon, CA (US)

(73) Assignee: Douglas P. Arduini, San Ramon, CA (US)

( * ) Notice: Subject to any disclaimer, the term of this patent is extended or adjusted under 35 U.S.C. 154(b) by 0 days.

(21) Appl. No.: 13/493,937

(22) Filed: Jun. 11, 2012

(65) Prior Publication Data

US 2012/0248700 A1     Oct. 4, 2012

Related U.S. Application Data

(63) Continuation-in-part of application No. 12/807,124, filed on Aug. 27, 2010, now abandoned.

(51) Int. Cl.
| | | |
|---|---|---|
| A63F 3/00 | (2006.01) | |
| A63F 3/04 | (2006.01) | |
| G09B 3/02 | (2006.01) | |
| G09B 19/00 | (2006.01) | |
| G09B 19/22 | (2006.01) | |
| A63F 1/06 | (2006.01) | |
| A63F 3/02 | (2006.01) | |
| A63F 9/18 | (2006.01) | |
| A63F 1/04 | (2006.01) | |
| A63F 9/06 | (2006.01) | |

(52) U.S. Cl.
CPC ............. *A63F 3/00643* (2013.01); *A63F 1/062* (2013.01); *A63F 3/00006* (2013.01); *A63F 3/02* (2013.01); *A63F 3/04* (2013.01); *A63F 9/18* (2013.01); *A63F 9/183* (2013.01); *A63F 2001/0441* (2013.01); *A63F 2009/0618* (2013.01); *G09B 3/02* (2013.01); *G09B 19/00* (2013.01); *G09B 19/22* (2013.01)
USPC ........................................... 273/249; 273/430

(58) Field of Classification Search
USPC .................................. 273/248, 249, 430, 431
See application file for complete search history.

(56) References Cited

U.S. PATENT DOCUMENTS

| | | | | |
|---|---|---|---|---|
| 3,735,506 | A | | 5/1973 | Kunert |
| 4,201,388 | A | * | 5/1980 | Cantelon ........................ 273/251 |
| 5,156,407 | A | * | 10/1992 | Moore ........................... 273/249 |
| 5,261,671 | A | | 11/1993 | Wyatt |
| 5,288,075 | A | * | 2/1994 | Kelley ........................... 273/243 |
| 5,660,389 | A | | 8/1997 | Freda, III |
| 5,692,752 | A | | 12/1997 | Hanna |
| 6,053,741 | A | * | 4/2000 | Wood ............................ 434/348 |
| 6,267,376 | B1 | * | 7/2001 | Jenkins ......................... 273/258 |

* cited by examiner

*Primary Examiner* — Vishu K. Mendiratta

(74) *Attorney, Agent, or Firm* — David Lewis; Bowen Liu

(57) ABSTRACT

Typically, games are created for entertainment purposes involving trivia information or games are created for educational purposes focused on particularized subjects. Currently, there exists a need for a game that challenges players with questions from a broad range of topics useful for everyday life that are non-trivia.

9 Claims, 23 Drawing Sheets

FIG. 9A

Health & Nutrition

1

Health & Nutrition

FIG. 9B

QUESTION
What do you do in an earthquake if you are indoors?
A. Run out of the building
B. Get under a desk or table
C. Stay where you and don't panic
D. Get to a phone and call your family ANSWER
B. Get under a desk or table DESCRIPTION
Take cover under a sturdy desk, table, or bench or against an inside wall, and hold on. If there isn't a table or desk near you, cover your face and head with your arms and crouch in an inside corner of the building.

QUESTION
What poisonous plants are found in many houses, yards, gardens, and parks?
A. Lily of the valley
B. Rhubarb leaf blade
C. Jasmine berries
D. All of the above ANSWER
D. All of the above DESCRIPTION
All of the these and many more, so be very careful with children and pets.

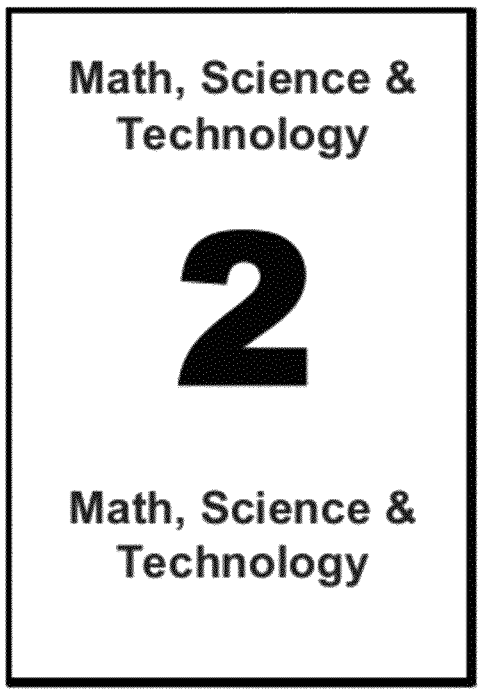

Math, Science &
Technology

2

Math, Science &
Technology

QUESTION
Why should you fill your gasoline tank
during the coolest time of the day?
A. The gasoline tank is larger when hot.
B. The gasoline pump runs slower when
cold.
C. The gasoline is lighter when cold.
D. The gasoline is heavier and denser
when cold.

ANSWER
D. The gasoline is denser when cold.

DESCRIPTION
Buy gasoline during the coolest time of
day, early morning and late evening when
the gas is most dense. Gas pumps
measure volume of gasoline, not the
density of fuel concentration. Also there is
less evaporation of gasoline as you pump.

QUESTION
What is the major cause of the rising
and falling of the tide waters of the
earth's oceans?
A. The Sun
B. The Moon and Sun
C. The Earth's weather
D. The Earth's winds ANSWER
B. The Moon and Sun DESCRIPTION
The gravitational attraction of the
Moon and the Sun upon Earth's
oceans is the major force involved in
the creation of tides. The Sun is so far
away, its tide-raising force is only
about half that of the Moon.

Money & Economics

3

Money & Economics

FIG. 11B

QUESTION
If you are paying income tax at the 25% tax rate, how much less tax do you pay with a $1,000 tax credit?
A. $250
B. $500
C. $750
D. $1000

ANSWER
D. $1000

DESCRIPTION
A tax credit reduces tax liability, as opposed to deductions or exemptions, which reduce taxable income.

QUESTION
If a manufacturer sells his product with a 100% markup on his cost, how much percent of profit margin does he make on the sale?
A. 100%
B. 75%
C. 50%
D. 25%

ANSWER
C. 50%

DESCRIPTION
Markup is a percentage above the net cost, where profit is percent of the sell price above the net cost. A 100% markup represents a 50% gross margin. Gross margin is just the percentage of the selling price that is profit.

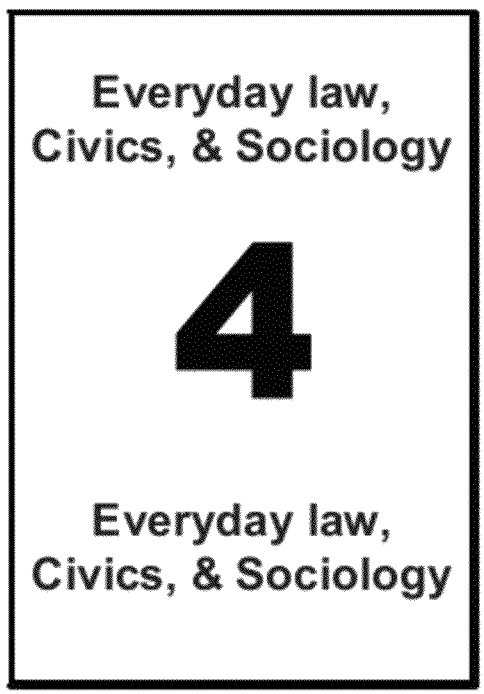

Everyday law,
Civics, & Sociology

4

Everyday law,
Civics, & Sociology

QUESTION
What is Non-Trivia?
A. Unimportant matters and obscure facts
B. Insignificant and simplistic
C. Unimportant and of little value
D. Essential, significant, and useful ANSWER
D. Essential, significant, and useful DESCRIPTION
Trivia is the noun for trivial the adjective, with the antonym of essentials. Non-Trivia is the opposite of Trivia: unimportant things, a collection of insignificant or obscure items, details, or information.

QUESTION
What is an example of a win-win agreement or contract?
A. Where you win on all of your terms and the other party doesn't win.
B. Where you win and the other party wins and both parties benefit from keeping the agreement.
C. When you win 2 contracts on your terms.
D. When both parties come to an agreement.

ANSWER
B. Where you win and the other party.

DESCRIPTION
In a win-win contest, agreement, or contract, all participants can profit from it in one way or the other. In conflict resolution, a win-win strategy is a conflict resolution process that aims to accommodate all disputants.

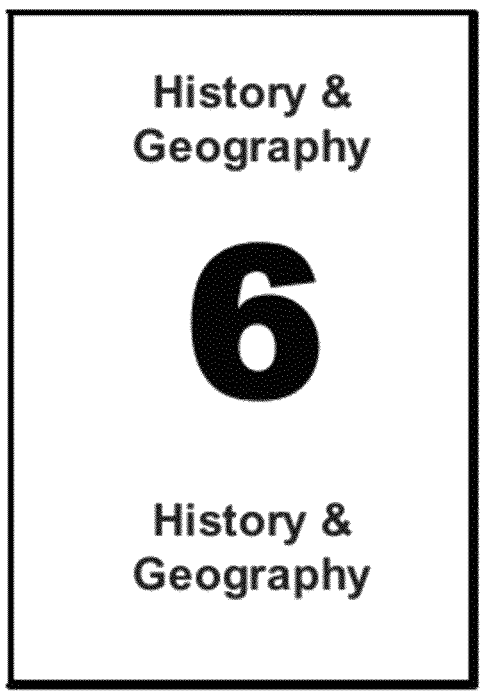

History &
Geography

6

History &
Geography

```
            QUESTION
If the sun sets in front of you,
approximately what direction is to your
left?
A. East
B. West
C. North
D. South ANSWER
D. South DESCRIPTION
The time of sunset is the moment the
trailing edge of the sun's disk disappears
below the horizon in the west. Due to
Earth's axial tilt, whenever and wherever
sunset occurs, sunset is always to the
northwest from the March equinox to the
September equinox, and to the
southwest from the September equinox
to the March equinox.

6-001
```

```
            QUESTION
What separates the northern and
southern hemispheres of the Earth?
A. North pole
B. South pole
C. Prime meridian
D. Equator ANSWER
D. Equator DESCRIPTION
Midway between the poles, the equator,
a great circle, divides the earth into
northern and southern hemispheres.

Non-Trivia Quest

*Educational Board Game   First Edition 2010   USA Version*

"What You NEED to Know" for "The REAL Game of Life"

Non-Trivia Quest is the REAL Game of Life because it is an educational game to learn and discuss all of the things we should know for a more successful, happy, and healthy life. The goal of the game is to make it interesting and fun to learn and make you think about all of the subjects that affect our daily lives and understanding of the world around us. These subjects are what we need to know and understand to improve our lives, thereby to be more prepared, self assured, understanding, and prepared to fit into the society of today's world of knowledge and awareness.

Trivial Pursuit is the game of trivia, or of the things that are of little importance in our life. But Non-Trivia Quest is the opposite, or the game of the important things we should know and understand in our lives. Of course, what is classified as non-trivia is very subjective. So the goal is to choose subjects that we all need to know something about in our modern society to be able to understand, communicate, and manage our lives at a comfortable and successful level. They include all the things we learn about too late in life. Many of these subjects are what we should have learned in school but didn't, or wish that we had learned years ago to have made a difference today.

Have you ever said, "If I only knew then what I know now, my life would have been so much better?"

Have you ever said, "Why didn't they teach me this in school or when I was growing up?"

Have you ever said "Why did it take me so long to learn the things I should have known were important to me?"

Have you ever said "I'm good at trivia like Trivial Pursuit, but what I really need is to be good at non-trivia?"

Well many of those things can be part of an educational and enlightening game. That is the purpose of this Non-Trivia Quest game of life.

EQUIPMENT CONTENTS

300 Question & Answer Cards • Game board • 2 die • 8 Pawn Tokens • Card Tray • Instruction Sheet

GAME OBJECT

The object of the game is not just to win or lose, but to expand our awareness of things that we should know more about. It is not designed to be difficult with a test of memorization or knowledge, but more an experience and awareness with an expansion of thought and remembering or reminding us in the important subjects of our life. The game should be a fun and stimulating experience each time you play it.

All players of the game are encouraged to submit their ideas and contribute non-trivial questions and answers with references for consideration in our new editions of the game. If selected for use, you will be honored with a credit toward the purchase of future game editions.

*FIG. 15A*

Future new editions of the game are planned for, but not limited to, different countries and demographics, age groups, and subject areas. Learn about the latest game versions and submit your ideas at www.Non-TriviaQuest.com. A user's game blog is also available.

The object of the game is simply to answer the most correct questions correctly and reach the opposite end of the game board. Questions will be picked from the top card in the one of the subject category numbers on the thrown dice.

The game has the following sets of cards with the number (choice selected from the dice numbers) and subject as described below.

1 Health & Nutrition

2 Math, Science, & Technology

3 Money & Economics

4 Law, Civics, & Sociology

5 Computer & Internet

6 History & Geography

GAME RULES

The game is a board game with 2 to 8 players for a race to the finish line across the board. Each player has a chosen token on the board to represent him or her. Each player takes turns throwing a pair of dice for his/her choice of 1 through 6 numbers that come up on either dice, and will re-throw the dice until he gets 2 different numbers to chose between for the desired subject choice. The numbers 1 through 6 each represent a subject of his/her choice to field questions to play the game. There are many rules that may be imagined. The following are the simplest choices, depending on the desired time and difficulty of the game.

The players will choose whom will go first by rolling the dice for highest total number.

The players take turns clockwise around the table. The player to the right of the player rolling the dice is the reader and will take the top card from number and subject chosen from by the rolling player and read the question. After the rolling player answers the question, the rolling player will read the card answer and description for correctness and possible discussion.

There are various choices of game rules as suggested below.

1. Fastest game - A correct answer allows the player to advance his/her token 2 spaces forward toward the finish line. An incorrect answer will not advance and remain as before that turn.

2. Slower game - A correct answer allows the player to advance his/her token 2 spaces forward toward the finish line. An incorrect answer forces the player to retreat his/her token back 1 space away from the finish line.

3. Slowest game - A correct answer allows the player to advance his/her token 1 space forward toward the finish line. An incorrect answer forces the player to retreat his/her token back 1 space away from the finish line.

4. A most difficult game can be played with only one die and one category of cards to pick.

Each player only gets one turn at a time as each player consecutively gets his/her turn. The first player to reach the other end of the board (the finish line) is the winner.

---

NOTICE: This game is for entertainment purposes only and that while we tried to make it as factually accurate as possible, that we are not liable for any errors or omissions in the information communicated. Any medical or health information is for general knowledge only and is not to be taken as medical or health advice.

Patent Pending
Made in China

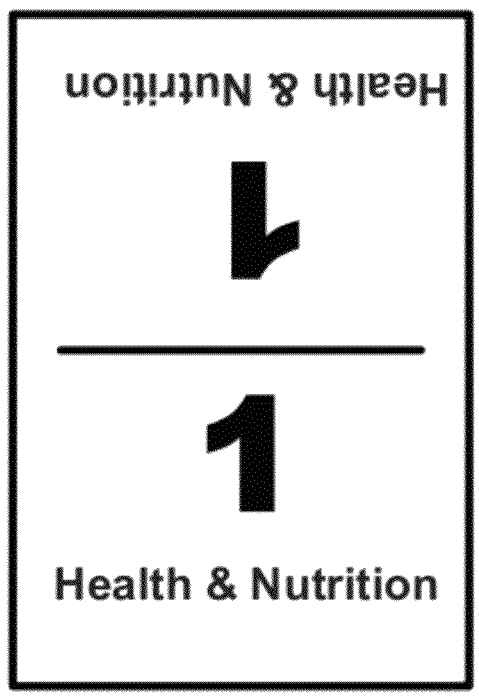

FIG. 17B

QUESTION
What do you do in an earthquake if you are indoors?
A. Run out of the building
B. Get under a desk or table
C. Stay where you and don't panic
D. Get to a phone and call your family ANSWER
B. Get under a desk or table DESCRIPTION
Take cover under a sturdy desk, table, or bench or against an inside wall, and hold on. If there isn't a table or desk near you, cover your face and head with your arms and crouch in an inside corner of the building.

QUESTION
What poisonous plants are found in many houses, yards, gardens, and parks?
A. Lily of the valley
B. Rhubarb leaf blade
C. Jasmine berries
D. All of the above ANSWER
D. All of the above DESCRIPTION
All of the these and many more, so be very careful with children and pets.

1-002

QUESTION

What are some common sources of carbon monoxide (CO) gas poisoning?

A. Automobile exhaust or BBQ in enclosed space
B. Electric motor or fan in enclosed space
C. Hair dryer or curling iron in enclosed space
D. Sound systems or TV in enclosed space

ANSWER

A. Automobile exhaust or BBQ in enclosed space

DESCRIPTION

CO is a product of combustion of organic matter under conditions of restricted oxygen supply and from improper ventilation of exhaust fumes as in an enclosed space. CO sources in addition to automobile exhaust, charcoal or gas stoves and BBQs in an enclosed space may also include house fires, faulty furnaces, heaters, wood-burning stoves and fire places, gasoline or propane-fueled heaters, equipment, appliances and tools. High levels of CO inhalation can cause death.

FURTHER STUDY, REFERENCES, LINKS

"Carbon Monoxide: A Clear and Present Danger" by Dwyer, Leatherman, Manclark, and Kimball (Paperback - Jan. 2004)
http://en.wikipedia.org/wiki/Carbon_monoxide_poisoning
http://www.emedicinehealth.com/carbon_monoxide_poisoning/page2_em.htm
http://www.epa.gov/iaq/pubs/coftsht.html 1-006

FIG. 19

NON-TRIVIA GAME AND METHOD OF PLAY

This application is a continuation-in-part of U.S. patent application Ser. No. 12/807,124, entitled "NON-TRIVIA GAME AND METHOD OF PLAY," by Douglas P. Arduini, filed Aug. 27, 2010 now abandoned, which is incorporated herein by reference in its entirety.

FIELD

The current specification relates generally to board games.

BACKGROUND

The subject matter discussed in the background section should not be assumed to be prior art merely as a result of its mention in the background section. Similarly, a problem mentioned in the background section should not be assumed to have been previously recognized in the prior art. The subject matter in the background section merely represents different approaches to accomplishing various tasks.

Typically, games are created for entertainment purposes involving trivia information or games are focused on particularized subjects. Currently, there exists a need for a game that challenges players with non-trivia information from a broad range of topics that may be educational, valuable, and useful for everyday life.

BRIEF DESCRIPTION OF THE FIGURES

In the following drawings like reference numbers and labels are used to refer to the same elements. Although the following figures depict various examples of inventions associated with this specification, the inventions associated with this specification are not limited to the examples depicted in the figures.

FIGS. 9A, 9B and 9C show an embodiment of two sample question and answer card front sides and one backside from non-trivia question category one.

FIGS. 10A, 10B, and 10C show an embodiment of two sample question and answer card front sides and one backside from non-trivia question category two.

FIGS. 11A, 11B, and 11C show an embodiment of two sample question and answer card front sides and one backside from non-trivia question category three.

FIGS. 12A, 12B, and 12C show an embodiment of two sample question and answer card front sides and one backside from non-trivia question category four.

FIGS. 14A, 14B, and 14C show an embodiment of two sample question and answer card front sides and one backside from non-trivia question category six.

FIGS. 15A and 15B show an embodiment of a set of sample instructions for playing the non-trivia game.

FIGS. 17A, 17B, and 17C show an alternative embodiment of two sample question and answer card front sides and one backside from non-trivia question category one.

FIG. 19 shows an alternative embodiment of a sample and question and answer card front side from non-trivia question category one.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-19 is a brief description of each element, which may have no more than the name of each of the elements in the particular figure that is being discussed. After the brief description of each element, each element of FIGS. 1-19 is further discussed in numerical order. In general, each of FIGS. 1-19 is discussed in numerical order, and the elements within FIGS. 1-19 are also usually discussed in numerical order to facilitate easily locating the discussion of a particular element. Nonetheless, there is not necessarily any one location where all of the information of any element of FIGS. 1-19 is located. Unique information about any particular element or any other aspect of any of FIGS. 1-19 may be found in, or implied by, any part of the specification.

In various places in discussing the drawings, a range of letters, such as a-n . . . are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "m") comes earlier in the alphabet than another letter (e.g., "n"), the order of these letters in the alphabet does not mean that the earlier letter represents a smaller number. The value of the earlier letter is unrelated to the later letter, and may represent a value that is greater the same or less than the later letter.

Game Components

Figure 1:
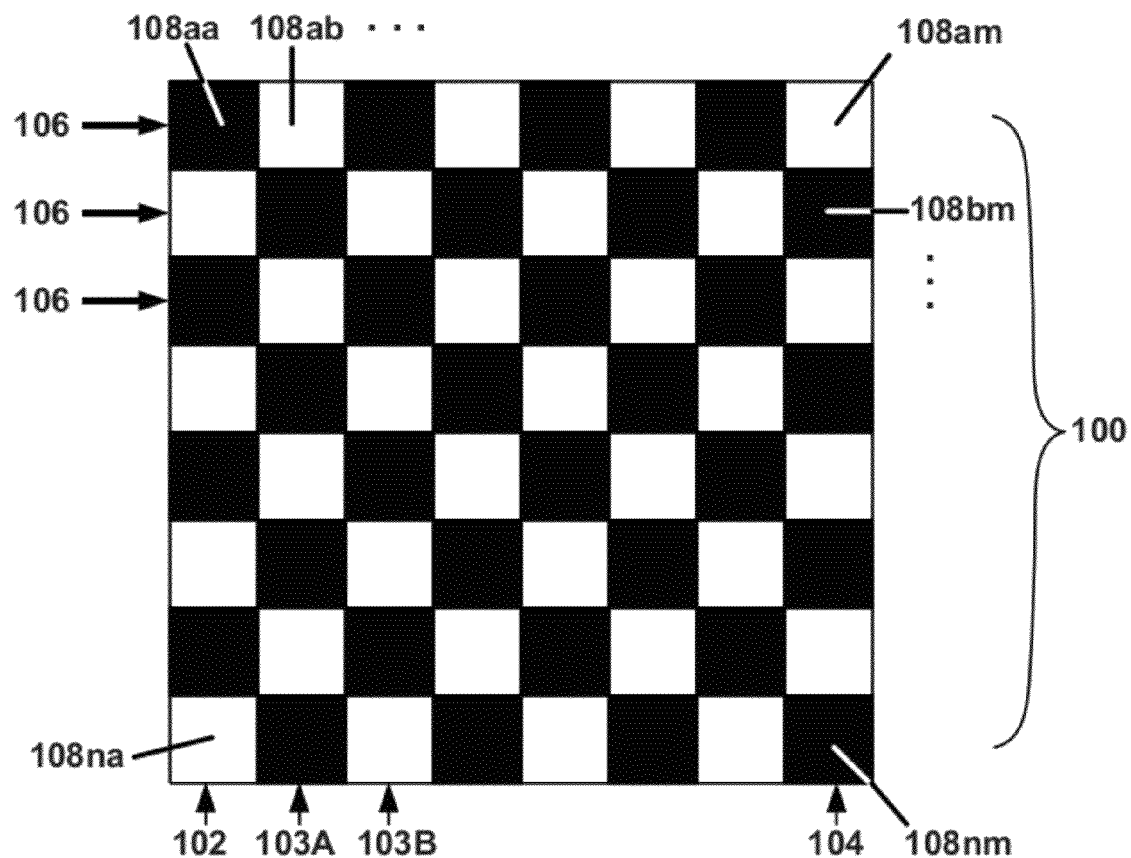
FIG. 1 shows a diagram of an embodiment of a playing board used for tracking the progress of players from a starting line toward a finish line.

FIG. 1 shows a playing board 100 used for tracking the progress of players from a starting line 102 toward a finish line 104. Playing board 100 may be composed of any number of lanes 106, each lane 106 having any number of spaces 108*aa* thru 108*nm*. Playing board 100 may also contain starting line 103A and 103B. In other embodiments, playing board 100 may not have all of the components listed and/or may have other elements instead of, or in addition to, those listed above.

The playing board 100 may contain a starting line 102 opposite a finishing line 104. The starting line 102 may be a line designated at one end of the playing board 100 where players initially begin game play. In an embodiment, the starting line 102 may be staggered, allowing some players to begin play closer to the finishing line 104. For example, children playing the game with adults may be given an advantage, the children beginning game play at starting line 103A or 103B while adults begin at starting line 102. The finishing line 104 may be a designated line used for determining when game play has been completed. The finishing line 104 may be at the opposite end of the playing board 100 from the starting line 102. Similar to the starting line 102, the finishing line 104 may be staggered to allow certain players to complete play earlier than other players. For example, the finish line for a younger player may be reached a number of spaces 108*aa* thru 108*nm* earlier than an adult player.

The playing board 100 may contain a grid pattern forming lanes 106. Each lane 106 may represent the progress of the player assigned to the lane, as the player attempts to answer questions during game play. Each lane 106 may be formed by a number of spaces 108*aa* thru 108*nm*. Each space 108*aa* thru 108*nm* may represent the advancement of players from the starting line 102, 103A, or 103B toward the finish line 104. For example, if a player correctly answers a question, his or her token may be advanced forward toward the finish line 104 a predetermined number of spaces 108*aa* thru 108*nm* depending on the pace of play chosen for the game. If a player incorrectly answers a question, his or her token may be moved back a predetermined number of spaces 108*aa* thru 108*nm* toward the starting line 102, 103A, 103B or remain stationary, depending on the pace of play chosen for the game.

In an embodiment, the playing board 100 may contain eight lanes 106, each lane 106 containing eight spaces 108*aa* thru 108*nm* between the starting line 102 and the finish line 104. In an alternative embodiment, the playing board 100 may contain more lanes 106 to accommodate a greater number of players. Additionally, the lanes 106 may contain more than eight spaces 108*aa* thru 108*nm*, extending the number of spaces 108*aa* thru 108*nm* a player would need to advance before winning the game.

In yet another embodiment, the playing board 100 may contain both more lanes 106 and spaces 108*aa* thru 108*nm*. In an embodiment, the spaces 108*aa* thru 108*nm* may be square. In an alternative embodiment, the spaces 108*aa* thru 108*nm* may be rectangular. The spaces 108*aa* thru 108*nm* may be of any random alternating colors or the spaces 108*aa* thru 108*nm* may be all uniformly colored.

In an embodiment, the playing board 100 may be made of paper, laminate, cardboard, wood, plastic, or composite, among other materials.

Figure 2:
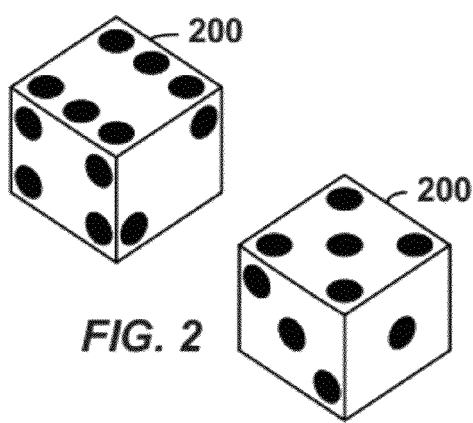
FIG. 2 shows a diagram of an embodiment of dice used for determining the order of players and for determining the categories from which questions are drawn.

FIG. 2 depicts a pair of dice 200 which may be used for determining the order of players and the categories from which questions are drawn. In an embodiment, each of the die 200 may have six numbered sides, each side marked uniquely with a number one through six. In other embodiments, the dice 200 may not have all of the components listed and/or may have other elements and/or configurations instead of, or in addition to, those listed above.

For example, as shown in FIG. 2, the sides of the dice may be marked with a number of dots representing a number one through six. Alternatively, the sides of the dice may be marked with Arabic numerals. Additionally, in other embodiments, the die may have more than six sides. In other embodiments, the die may be marked with numbers beginning at numbers other than one, for example, a seven sided die marked from two through eight. In yet other embodiments, there may be a single die or more than a pair of dice 200, for example, the use of three or more die.

The dice 200 may be used for determining the playing order of the game. For example, each player may roll the dice 200 and the player with the highest total deemed the first player. In the event two or more players have identical totals, the two or more players having identical totals may roll the dice 200 again, the player with the new highest total deemed the player taking an earlier turn. Alternatively, each player may roll the dice 200 and the player with the lowest total deemed the first player. In the event two or more players have identical totals, the two or more players having identical totals may roll the dice 200 again, the player with the new lower total deemed the player taking an earlier turn. In other embodiments, a spinner, lots, straws, or another mechanism may be used for determining turn order. In an embodiment, players may take turns clockwise from the first player. In another embodiment, the players may roll only a single die, with either the highest or lowest die value representing the first player. In yet another embodiment, players may roll more than a pair of dice 200, with either the highest or lowest totals representing the first player. In an alternative embodiment, players may take turns counter-clockwise from the first player. In an embodiment, each player takes their turn according to the relative value of their die roll compared to other players (the highest roll goes first, the second highest goes second etc.)

The dice 200 may also be used for determining which question categories a player may choose a question and answer card from. For example, after determining the playing order of the game, player one rolls the dice 200 to obtain a unique number from each of the individual die. Based on the two unique numbers obtained from the pair of dice 200, the player may choose to select a question and answer card from one of the numbered question categories, one thru six, that corresponds to one of the obtained dice numbers. For example, if the dice 200 show sides two and five, the current player has the option of answering a question selected from either question category two or category five. In an embodiment, if the numbers obtained are not unique, i.e., the two numbers on the dice are the same, the player may roll the dice again until unique numbers are obtained before selecting a question category. In an alternative embodiment, the player may select a question from the single question category corresponding to the one duplicate dice number obtained. In an embodiment, the player may roll only a single die and select a question from the single question category corresponding to the single die number obtained.

Figure 3:
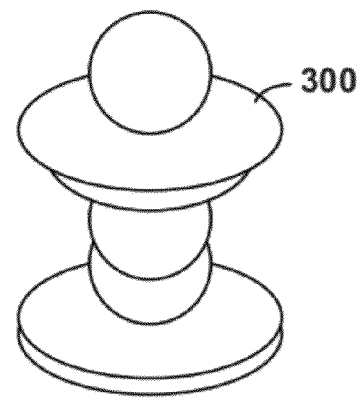
FIG. 3 shows a diagram of an embodiment of a token used for representing players on the game board during play.

FIG. 3 depicts a token 300 for representing players on the playing board 100. In other embodiments, token 300 may not have all of the components shown in FIG. 3 and/or may have other elements and/or configurations instead of, or in addition to, those shown.

In an embodiment, the token 300 may be any shape and/or color so long as the tokens allow players on the playing board to be distinguished from one another. For example, the tokens 300 may all be identically shaped except each token 300 has a unique color. Alternatively, the tokens 300 may be uniquely shaped. For example, each token 300 may be in the shape of a different animal, a unique geometric shape, or a collection of random objects such as a shoe, car, thimble, dog, etc. In an embodiment, the tokens 300 may be in the form of a peg which may be inserted into the playing board, the playing board having holes to accept the pegs and for tracking the progress of players during the game. In another embodiment, the tokens 300 may have both a unique shape and a unique color to further distinguish players on the playing board 100.

In an embodiment, at the start of the game each player participating in the game will have a representative token 300 at the starting line 102, 103A or 103B. By correctly answering a question, a player may advance their token 300 within their lane 106 toward the finishing line 104. Depending on the pace of play, incorrectly answering a question may result in a player having to move their token 300 backward a single space 108aa thru 108nm, multiple spaces 108aa thru 108nm, or remain stationary within their lane 106. In an alternative embodiment, when there may be a significant difference in skill and knowledge between the players, players may be allowed to advance their tokens 300 for a partially correct answer. For example, a younger player that partially answers a question correctly may be allowed to advance a single space 108aa thru 108nm instead of two spaces 108aa thru 108nm forward toward the finishing line 104. In yet another embodiment, correctly answering a question may result in advancing multiple spaces 108aa thru 108nm toward the finishing line 104 and incorrectly answering a question may result in advancing only a single space 108aa thru 108nm toward the finishing line 104.

Figure 4A:
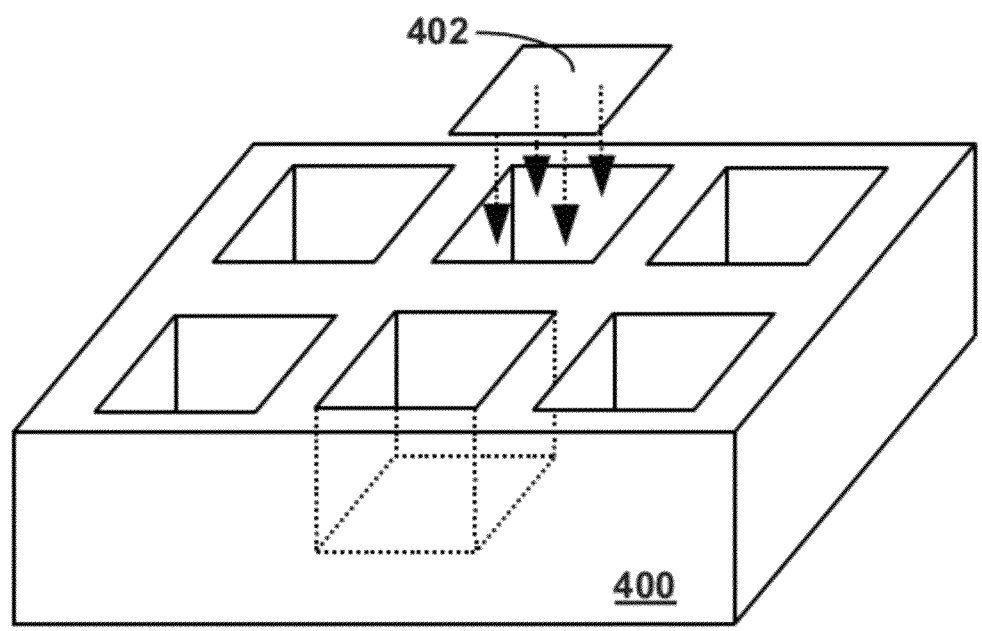
FIG. 4A shows a diagram of an embodiment of a card container for storing and organizing question and answer cards for each of the question categories.

FIG. 4A depicts a card container 400 used for storing and organizing the question and answer cards 402. In other embodiments, card container 400 may not have all of the components listed and/or may have other elements instead of, or in addition to, those listed above.

In the specification, the following words may be used interchangeably, as listed below: container may be interchanged with carrier, compartment may be interchanged with pocket, token may be interchanged with pawn, and each of these terms may be switched with one another to obtain different embodiments.

In an embodiment, the card container 400 has six compartments for containing six different categories of questions. Optionally, the card container 400 may have an extra compartment for temporarily holding the question and answer cards 402 that have already been answered and/or attempted during the course of the game. The extra compartment may also be used for holding the tokens and dice when the game is stored and not in use. In an embodiment, the card container 400 may have finger wells which may allow for easier access to the question and answer cards 402. In an embodiment, the finger access wells may extend to nearly the bottom of the compartments. In another embodiment, the finger access wells may extend to the bottom of the compartments. In yet another embodiment, the finger access wells may extend any distance toward the bottom of the compartments. In an embodiment, the question and answer cards 402 are organized into six non-trivia category types. Trivia refers to knowledge that is non-essential information, particularly details about popular culture. For example, a trivia question may ask about obscure information concerning a fictional character on a television program. Non-trivia refers to information that is essential, useful, and may be educational. For example, a non-trivia question may ask about what potential impending weather conditions can be expected when presented with the information the barometric pressure has rapidly dropped (high probability of an incoming storm front). In an embodiment, non-trivia question categories may be organized into:

1. Health & Nutrition
2. Math, Science & Technology
3. Money & Economics
4. Law, Civics, & Sociology
5. Computer & Internet
6. History & Geography In an alternative embodiment, the non-trivia categories may be organized into other different categories and/or a greater number of categories. For example, the non-trivia categories may be more detailed by dividing history questions and geography questions into their own categories. In another alternative embodiment, non-trivia categories may be organized into difficulty levels, where questions from each category may have increasing or decreasing difficulty and answering a more difficult question may allow for advancing a greater number of spaces 108aa thru 108nm toward the finishing line 104. In yet another embodiment, the questions may be organized based upon a loosely associated common thread. For example, the answers to all the questions in a category may all begin with the same letter.

While the question and answer cards 402 may be organized into six categories, the actual details of the questions may touch upon multiple categories. For example, a tax question drawn from category three may be associated with math, money and law but simply categorized into only category three. Similarly, a computer technology question may fit in both category two and category five.

The testing of a player's knowledge by attempting to correctly answer the non-trivia question and answer cards challenges players to learn information that may be educational and/or useful for everyday applications rather than for purely scholarly understanding or toward a particular course of study. For example, knowing that one should take cover under a desk or table while indoors during an earthquake is useful knowledge for everyday application (at least in areas that regularly experience earthquakes) yet, is not related to popular culture, nor geared toward scholarly understanding or any particular course of study. As another example, going to the filling station to purchase gasoline during the early morning or late evening when it is cooler results in the purchase of more gasoline at the same price is also useful knowledge for everyday application yet is not related to popular culture. While the knowledge may be subject matter covered in a physics course, questions regarding a particular subject (in this example, physics) may not be so numerous as to prepare a player with sufficient knowledge to take an exam in a course covering the subject. For example, a question may ask about the consequences of being taxed at a particular rate, which may be of great use in everyday life, yet a player would not be fully prepared to take a tax exam. In an embodiment, the subject matter covered is for entertainment purposes while being as factually accurate as possible. For example, a health and nutrition question may inquire about the signs of a heart attack. However, any medical and/or health information is for general knowledge only and is not to be taken as medical or health advice.

Each question and answer card 402 may have both a question and answer printed on the card. In an embodiment, the question and answer are printed on the same side of the card. In an alternative embodiment, the question and answer are printed on opposite sides of the card. In an embodiment, after the correct answer is an educational description of the correct answer that may be derived from single or multiple reference sources. In another embodiment, after the correct answer is an explanation of the correct answer that may be derived from single or multiple reference sources.

To prevent players from inadvertently viewing the questions and answers or gaining an unfair advantage by seeing answers prematurely, another player may read the question and answer card 402 and prompt the current player. Additionally, the question and answer cards 402 may be printed in a manner that provides for the secure viewing of the question and answer. For example, the question and answer cards 402 may be printed in such a manner that questions and answers are hidden within background markings that are of a color that make inadvertently viewing the question and answer text unlikely, and the intentional reading of the question and/or answer without the use of a color filter difficult. Alternatively, question and answer card 402 may be printed in such a manner that the question and answer are hidden within a background having a polarization that make reading the question and answer text very difficult without the use of a polarizing filter. In yet another embodiment, question and answer card 402 may be printed in any manner that makes reading the question and answer text very difficult by simply seeing the question and answer card 402 with the unaided human eye.

Figure 4B:
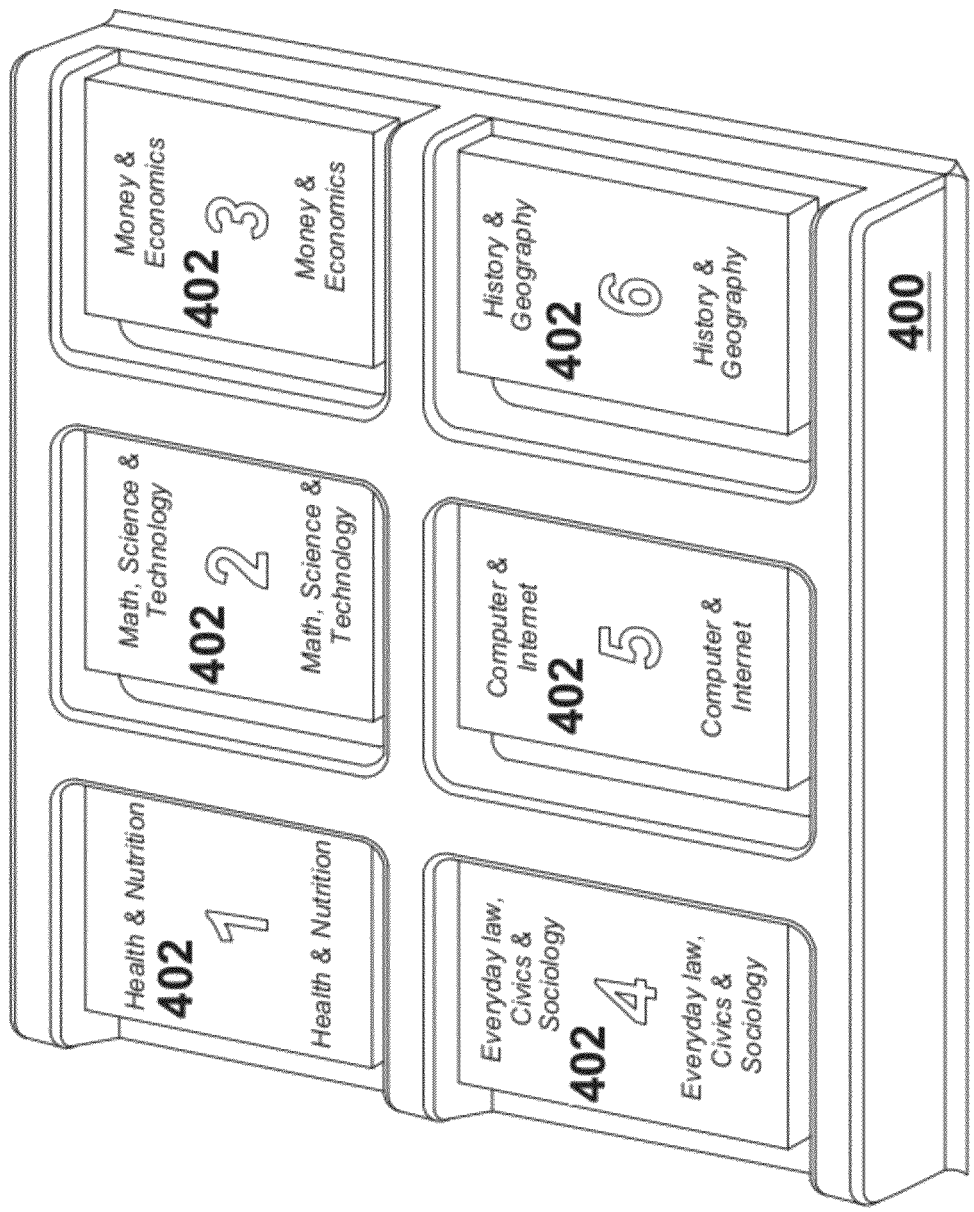
FIG. 4B shows a diagram of another embodiment of a card container for storing and organizing question and answer cards for each of the question categories.

FIG. 4B shows a diagram of an alternative embodiment of a card container 400 for storing and organizing question and answer cards 402 for each of the question categories. The card container 400 of FIG. 4B has question card compartments with an open side, which may allow for easier access to the question and answer cards 402.

Figure 4C:
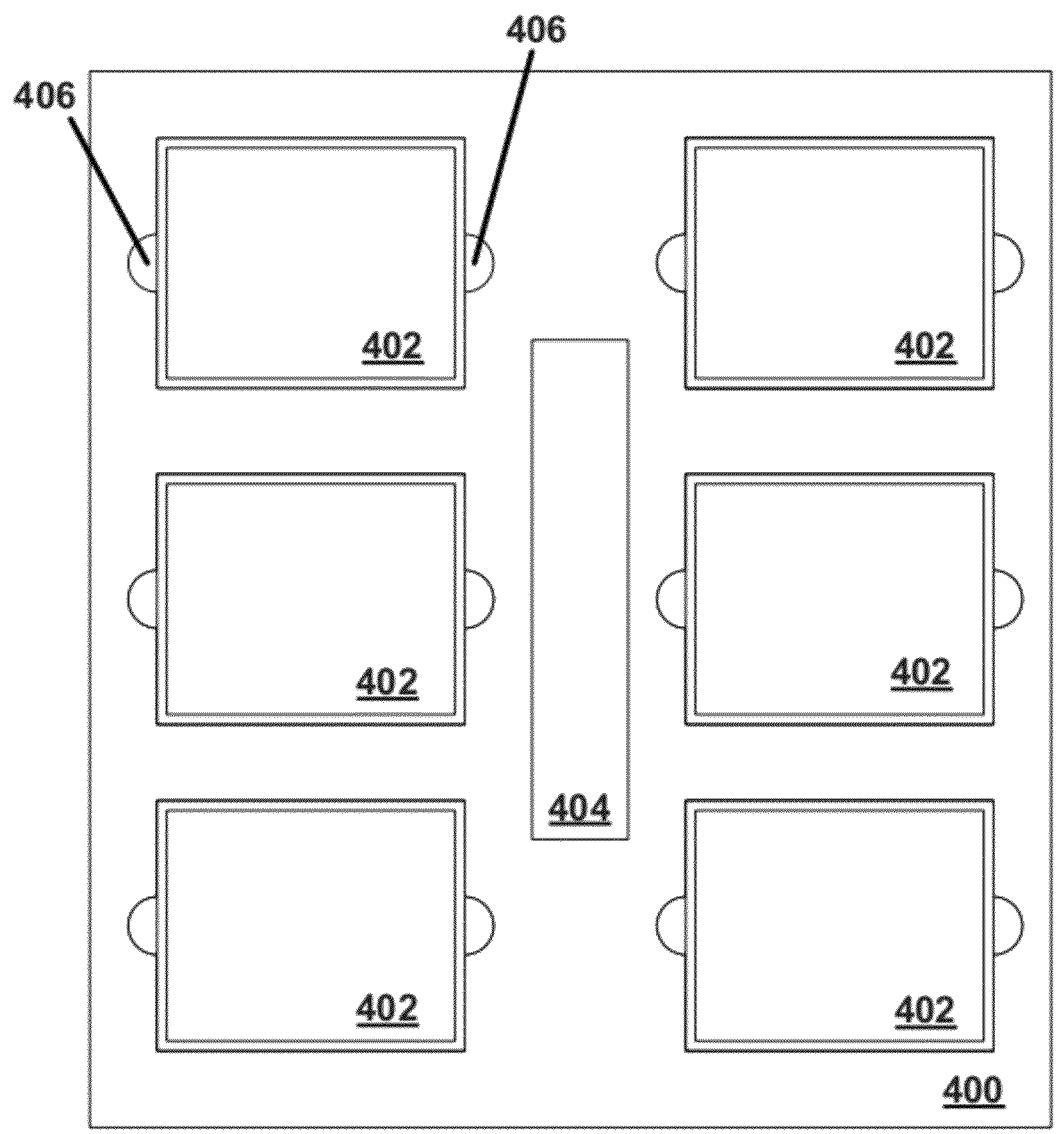
FIG. 4C shows a diagram of another embodiment of a card container for storing and organizing question and answer cards for each of the question categories.

FIG. 4C shows a diagram of an alternative embodiment of a card container 400 for storing and organizing question and answer cards 402 for each of the question categories. The card container 400 of FIG. 4C may contain accessory compartment 404. Accessory compartment 404 may be used for temporarily holding the question and answer cards 402 that have already been answered and/or attempted during the course of the game. The accessory compartment 404 may also be used for holding the tokens and dice when the game is stored and not in use. The card container 400 of FIG. 4C may have card compartments with finger access wells 406, which may allow for easier access to the question and answer cards 402. In an embodiment, the finger access wells 406 may extend to nearly the bottom of the question card compartments. In another embodiment, the finger access wells may extend to the bottom of the question card compartments. In yet another embodiment, the finger access wells 406 may extend any distance toward the bottom of the question card compartments.

Figure 5:
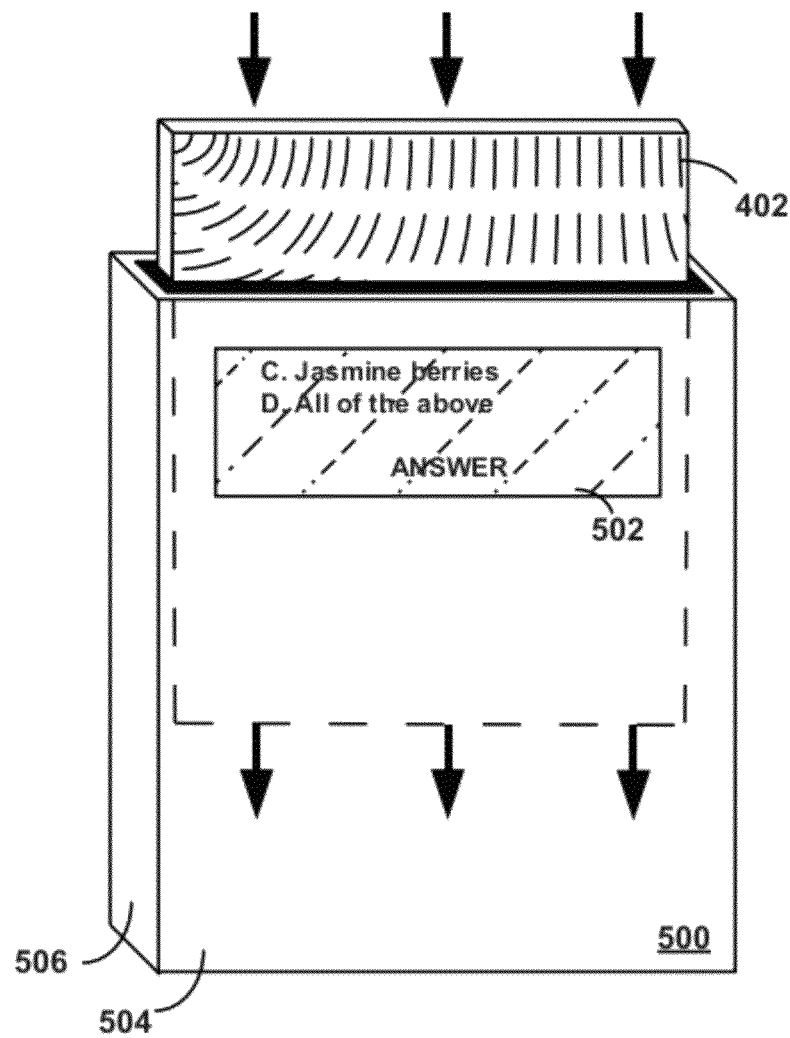
FIG. 5 shows a diagram of an embodiment of a question and answer card sleeve that provides for the secure viewing of questions and answers printed on the question and answer cards.

FIG. 5 shows a question and answer card sleeve 500 that provides for the secure viewing of questions and answers printed on the question and answer cards 402. Question and answer card sleeve 500 may contain a viewing window 502, front and rear walls 504, and sidewalls 506. In other embodiments, question and answer card sleeve 500 may not have all of the components listed and/or may have other elements instead of, or in addition to, those listed above.

The front and rear walls 504 and sidewalls 506 of question and answer card sleeve 500 may be made of any material that is opaque to prevent the inadvertent viewing of questions and answers or gaining an unfair advantage by seeing answers prematurely. Without the use of the question and answer card sleeve 500, attempting to view the questions and answers printed on the question and answer cards 402 may be extremely difficult while in plain sight of other players. In an alternative embodiment, the question and answer card sleeve 500 may be any material that is translucent. For example, question and answer card sleeve 500 may be of a translucent material that may be of similar color as the printed questions and/or answers, preventing the inadvertent viewing of the question and answers. Alternatively, the question card sleeve material may have a polarization that filters out the polarization of the light reflected off the questions and/or answers, so that the questions and/or answers cannot be read through the front and rear walls 504 of the question and answer card sleeve 500. The use of question and answer card sleeve 500 to read question and answer cards 402 may allow a player to prompt himself or herself with a question without inadvertently viewing the answer.

The viewing window 502 may be made of a color filtering material that allows the question and answer cards 402 to be easily read when viewed through the window. For example, the question and answer cards 402 may have a question and answer hidden within background markings that are of a particular color. The viewing window 502 may then be chosen to be made with a color filtering material that filters the same particular color printed on the question and answer card 402, leaving visible the question but the answer is hidden by the background markings of the particular color unless also viewed through the viewing window 502.

Alternatively, the viewing window 502 may be made of a polarizing filter material that allows the question and answer cards 402 to be easily read when viewed through the window. For example, the question and answer cards 402 may have a question but the answer is hidden within background markings that are polarized. Viewing window 502 may then be chosen to be made with a polarizing filter material that filters the polarized background markings on question and answer card 402, leaving visible the question but the answer is hidden by the polarized background markings unless also viewed through the viewing window 502.

Method of Play

Figure 6A:
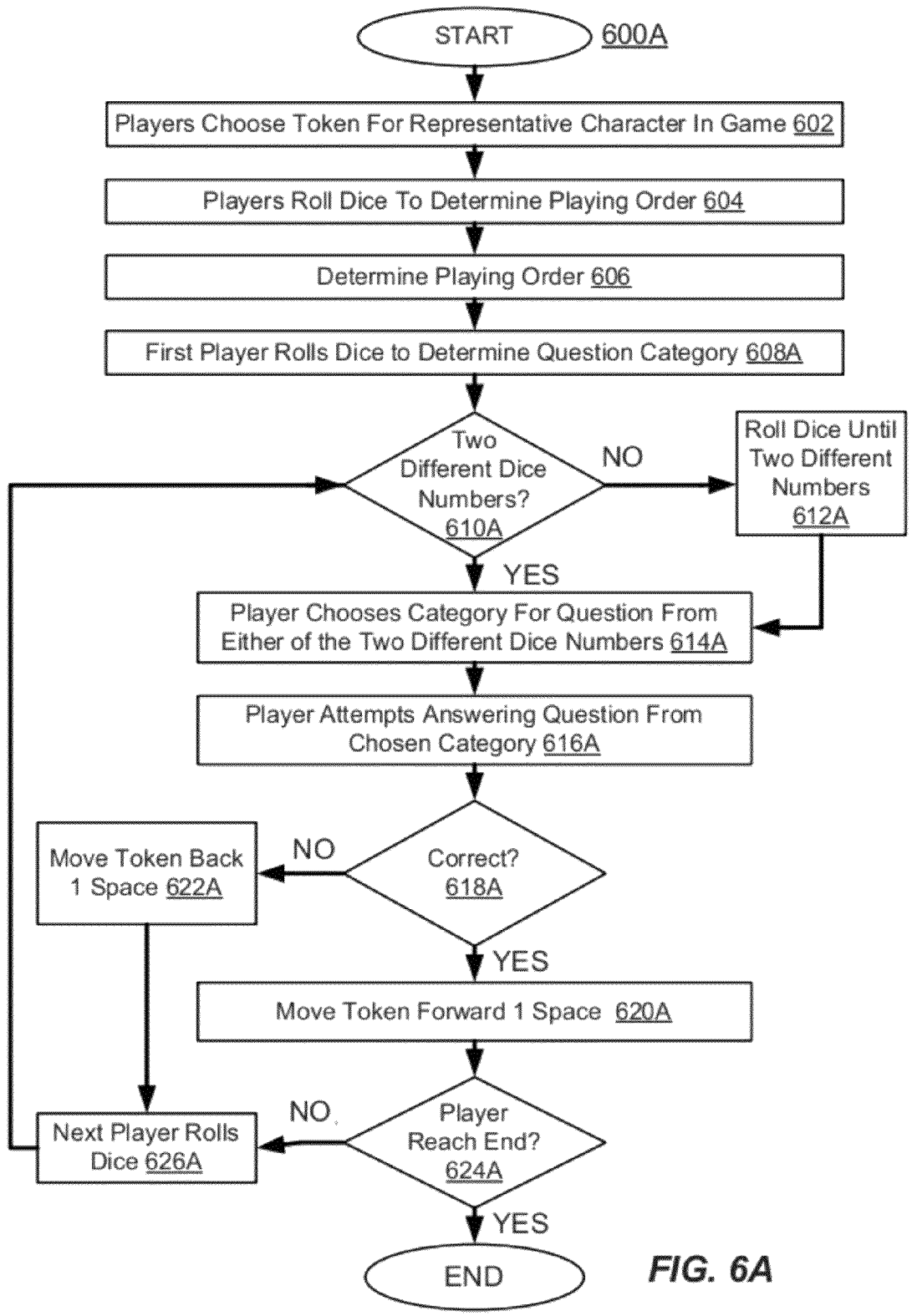
FIG. 6A shows a flowchart of an embodiment of a method of playing the non-trivia game at the slowest pace.

FIG. 6A shows a block diagram of a method 600A for playing the non-trivia game at the slowest pace. Method 600A is one of a number of different methods players may choose to play the non-trivia game. Choosing to play the non-trivia game at the slowest pace results in taking a greater length of time to complete the game as compared to playing the game at a slow pace (but which is not as slow as the slowest pace) or at the fastest pace. When playing the non-trivia game at the slowest pace, answering a question correctly may allow a player to advance his or her token 300 one space 108$aa$ thru 108$nm$ closer toward the finish line 104. However, answering a question incorrectly results in moving the token 300 back one space 108$aa$ thru 108$nm$ towards the starting line 102.

The method for playing the non-trivia game at the slowest pace begins in step 602 with players selecting a token 300 to represent and track their progress on the playing board 100. In step 604, each player rolls the dice 200 to individually obtain a dice total for determining the playing order. In step 606, players compare dice totals to determine the playing order. As described previously, in an embodiment, the player having the highest total may be deemed the first player with the remaining players taking turns clockwise around the table after the first player.

In step 608A, game play begins with the first player rolling the dice 200 to determine which two question categories will be available to choose a question and answer card 402 from. Upon rolling the dice, in step 610A, players determine whether the dice 200 have different numbers showing. If the dice 200 do not have different numbers showing, for example both die are showing the number five, in step 612A the player will roll the dice again until two different numbers are showing. If the dice 200 have two different numbers showing, in step 614A the rolling player chooses a category from which he or she will attempt to answer a question and answer card 402. The player to the right of the player rolling the dice may act as the reader and may draw the top question and answer card 402 from the question category chosen by the rolling player and read the question on the question and answer card 402.

In step 616A, the rolling player will attempt to answer the question on the question and answer card 402 drawn from the chosen category. In step 618A, a determination is made whether the rolling player correctly answered the question card. If the player answers the question correctly, in step 620A, the player may advance his or her token 300 one space 108 toward the finish line 104. If the rolling player answers the question incorrectly, in step 622A, the player will move his or her token 300 one space 108aa thru 108nm back toward the starting line 102, 103A, or 103B. In step 624A, a determination is made whether the rolling player has reached the finished line 104. If the rolling player has reached the finishing line 104, then the game ends, otherwise, it becomes the turn of the next player. In step 626A, the next player clockwise from the player who last rolled the dice 200 will repeat steps 608A through 626A. Players will continue to take turns rolling the dice 200 and answering questions until a player answers a question and answer card 402 correctly resulting in his or her token 300 reaching the finish line 104.

Figure 6B:
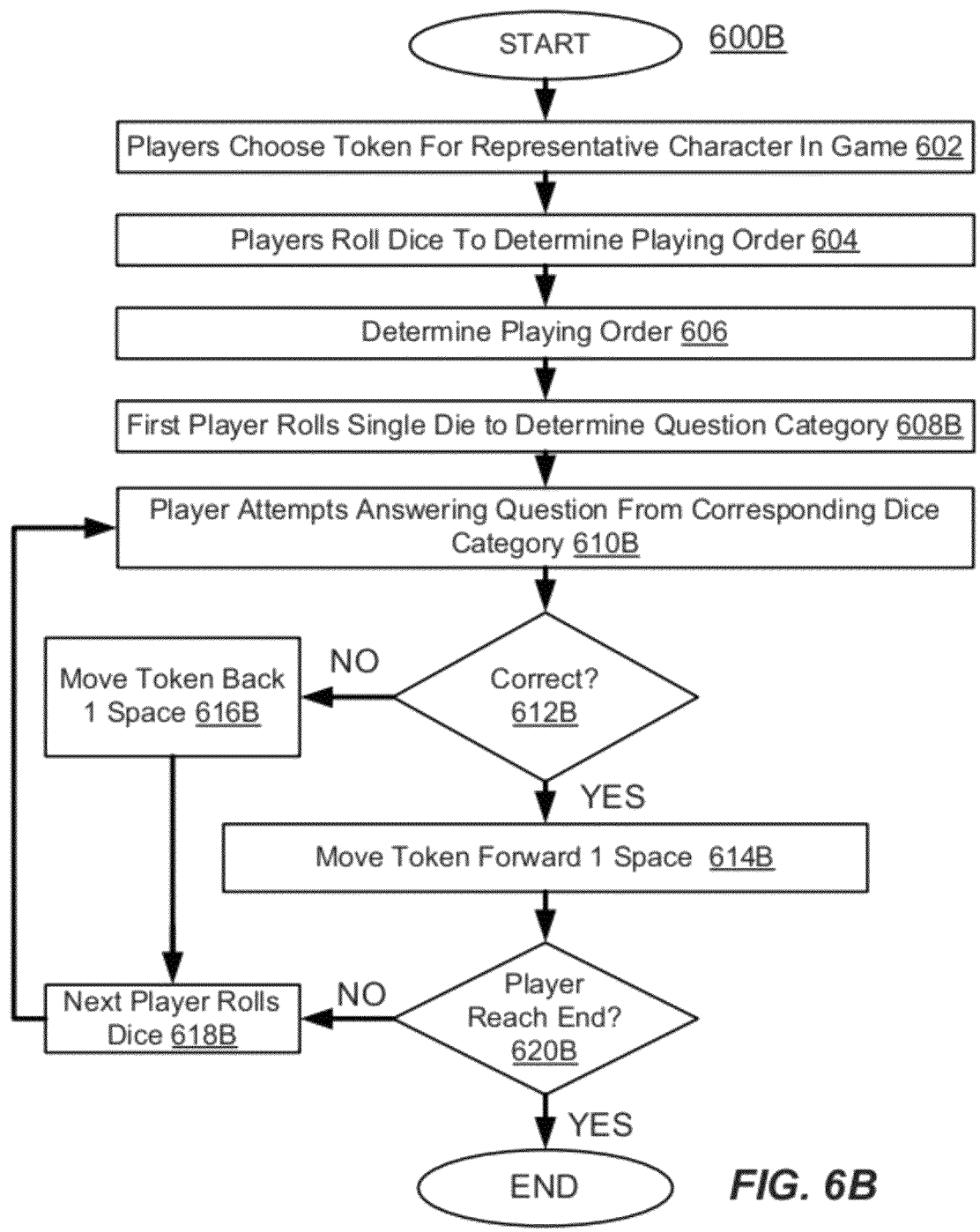
FIG. 6B shows a flowchart of an embodiment of a method of playing the non-trivia game at the slowest pace and at a higher difficulty.

FIG. 6B shows a flowchart of an embodiment of a method 600B of playing the non-trivia game at the slowest pace at a higher difficulty. The method 600B depicted in FIG. 6B differs from the method in FIG. 6A by allowing players to roll only a single die when determining which question category from which to draw a question and answer card 402. Choosing to play according to the rules of method 600B may increase the difficulty of the non-trivia game because players may be forced to choose a question and answer card 402 from an unfamiliar question category.

Figure 7A:
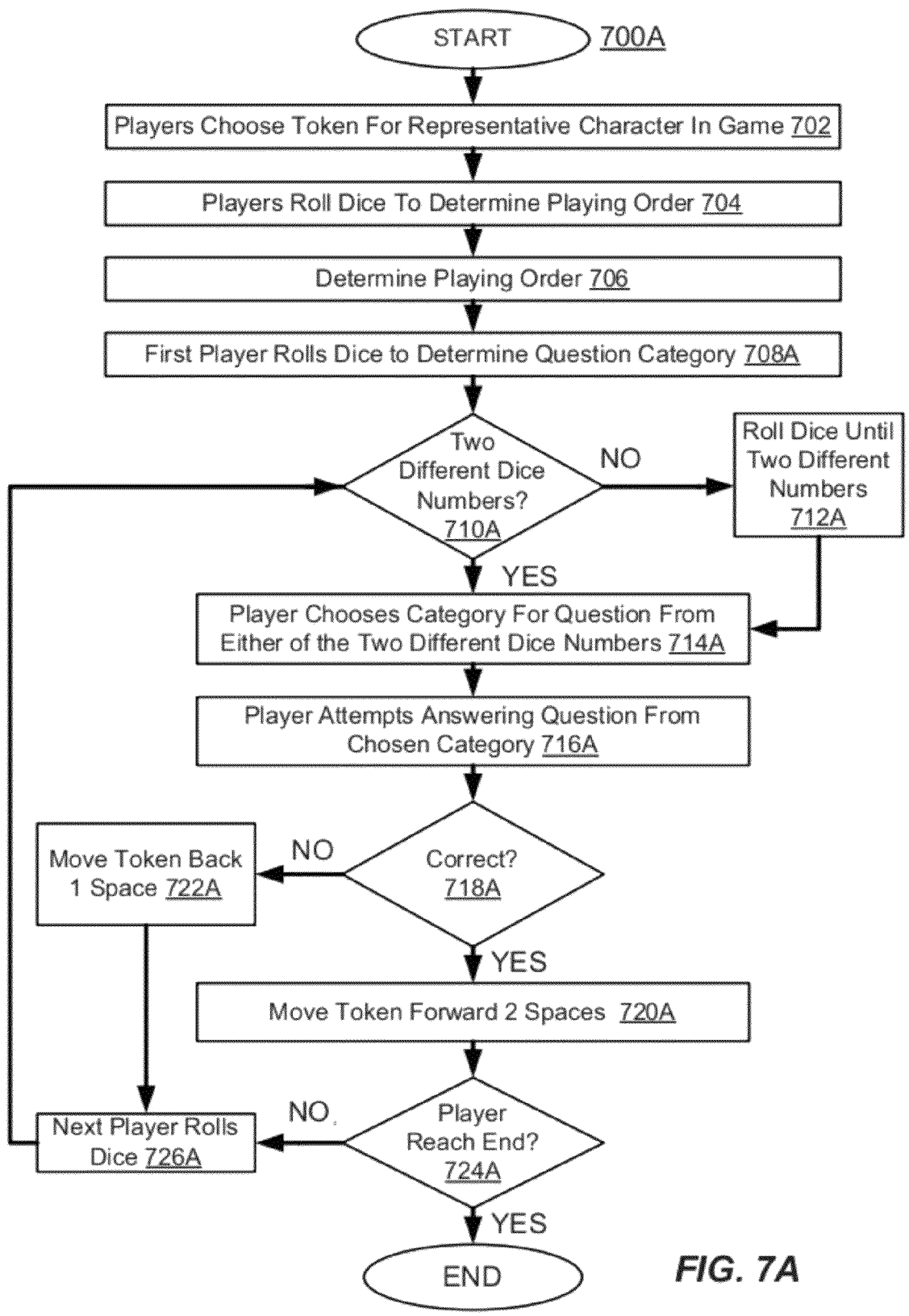
FIG. 7A shows a flowchart of an embodiment of a method of playing the non-trivia game at the slow pace.

FIG. 7A shows a block diagram of a method 700A for playing the non-trivia game at the slow pace. Method 700A is one of a number of different methods players may choose to play the non-trivia game. Choosing to play the non-trivia game at the slow pace results in game play taking less time to complete compared to playing the game at the slowest pace, but more time compared to playing the game at the fastest pace. When playing the non-trivia game at the slow pace, answering a question correctly allows a player to advance his or her token 300 two spaces 108aa thru 108nm closer toward the finish line 104. However, answering a question incorrectly results in moving the token back one space 108aa thru 108nm towards the starting line 102, 103A, or 103B.

The method 700A for playing the non-trivia game at the slow pace begins with the same steps as used in the method 600A for playing the game at the slowest pace. Steps 702-718A are the same as steps 602-618A. However, in contrast to method 600A, after attempting to answer the question in step 718A, if the player answers the question correctly, in step 720A, the player may advance his or her token 300 two spaces 108aa thru 108nm toward the finish line 104. If the rolling player answers the question incorrectly, in step 722A, the player will move his or her token 300 one space 108aa thru 108nm back toward the starting line 102, 103A or 103B. If the rolling player has reached the finishing line 104 then the game ends, otherwise, it becomes the turn of the next player. In step 726A, the next player clockwise from the player who last rolled the dice 200 will repeat steps 708A through 726A. Players will continue to take turns rolling the dice 200 and answering questions until a player answers a question and answer card 402 correctly resulting in his or her token 300 reaching the finish line 104.

Figure 7B:
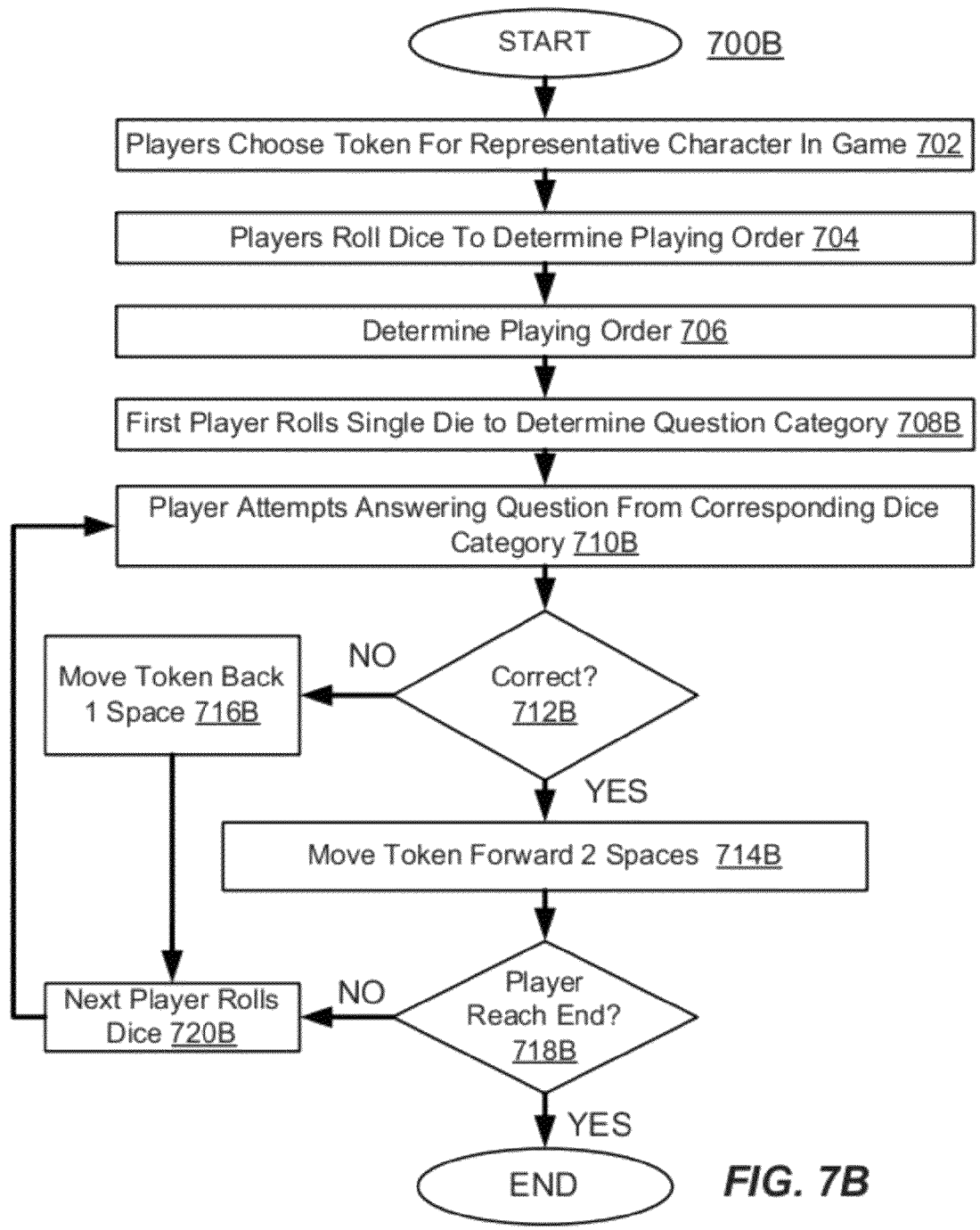
FIG. 7B shows a flowchart of an embodiment of a method of playing the non-trivia game at the slow pace and at a higher difficulty.

FIG. 7B shows a flowchart of an embodiment of a method 700B of playing the non-trivia game at the slow pace at a higher difficulty. The method 700B depicted in FIG. 7B differs from method 700A by allowing players to roll only a single die when determining which question category from which to draw a question and answer card 402. Choosing to play according to the rules of method 700B may increase the difficulty of the non-trivia game because players may be forced to choose a question and answer card 402 from an unfamiliar question category.

Figure 8A:
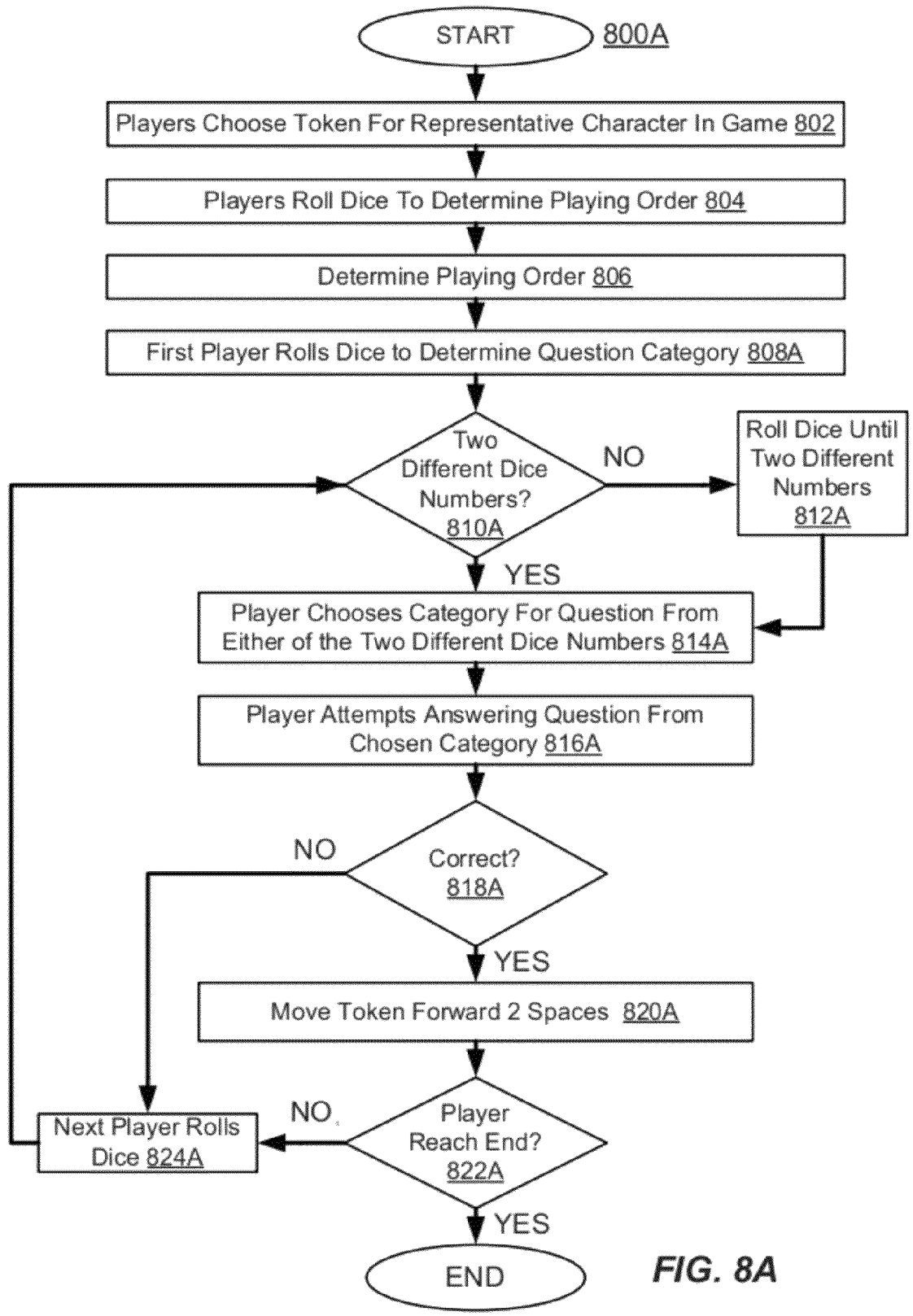
FIG. 8A shows a flowchart of an embodiment of a method of playing the non-trivia game at the fastest pace.

FIG. 8A shows a block diagram of a method 800A for playing the non-trivia game at the fastest pace. Method 800A is one of a number of different methods players may choose to play the non-trivia game. Choosing to play the non-trivia game at the fastest pace results in game play taking less time to complete as compared to playing the game at a slow pace or at the slowest pace. When playing the non-trivia game at the fastest pace, answering a question correctly allows a player to advance his or her token 300 two spaces 108aa thru 108nm closer toward the finish line 104. Answering a question incorrectly results in the token remaining stationary.

The method 800A for playing the non-trivia game at the fastest pace begins with the same steps as used in methods 600A and 700A for playing the game. Steps 802-818A are the same as steps 702-718A and 602-618A. However, in contrast to methods 600A and 700A, after attempting to answer the question in step 818A, if the player answers the question correctly, in step 820A, the player may advance his or her token 300 two spaces 108 toward the finish line 104. If the rolling player answers the question incorrectly, the player may leave his or her token 300 stationary. If the rolling player has reached the finishing line 104 then the game ends, otherwise, it becomes the turn of the next player. In step 824A, the next player clockwise from the player who last rolled the dice will repeat steps 808A through 824A. Players will continue to take turns rolling the dice 200 and answering questions until a player answers a question and answer card 402 correctly resulting in his or her token reaching the finish line 104.

Figure 8B:
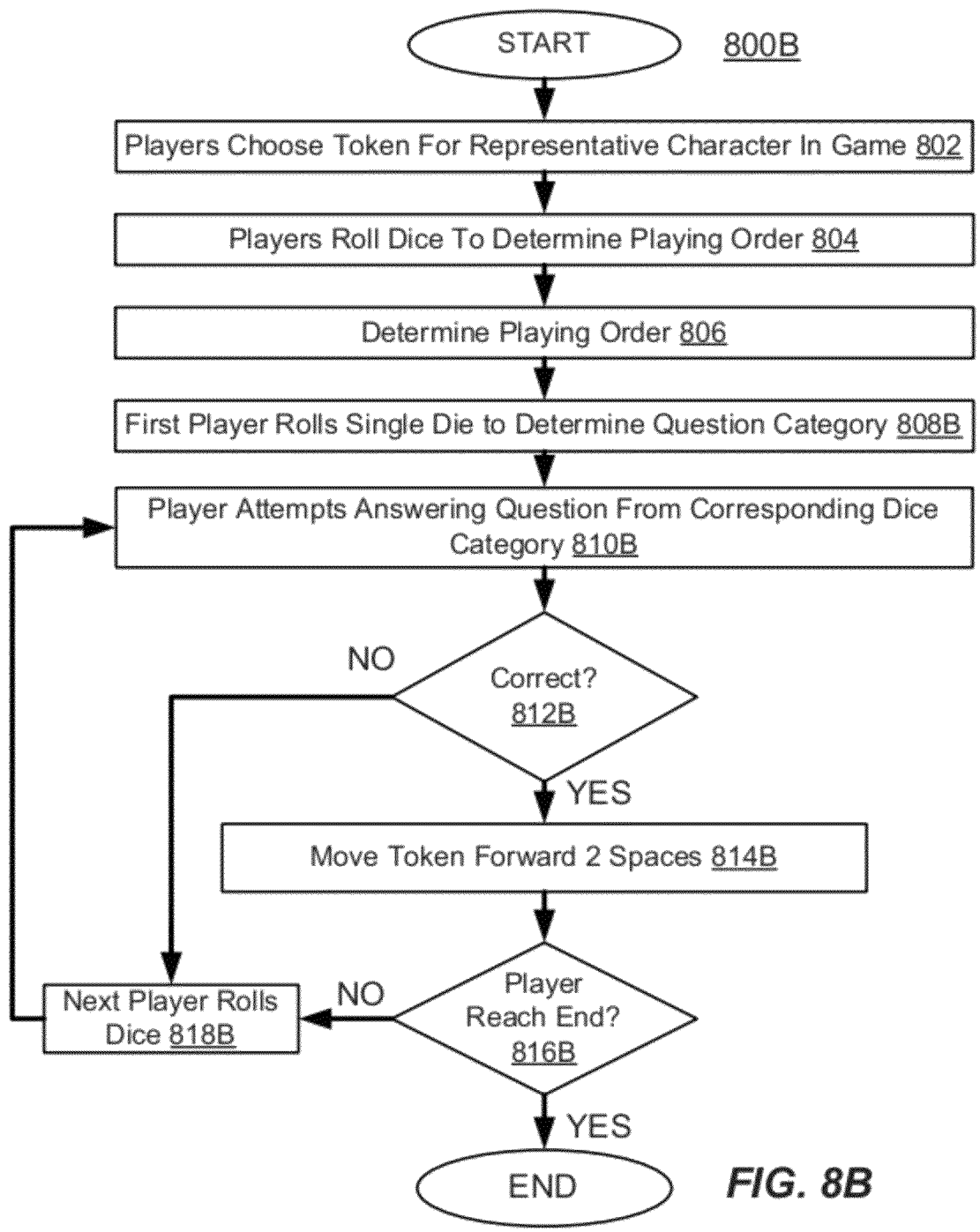
FIG. 8B shows a flowchart of an embodiment of a method of playing the non-trivia game at the fastest pace and at a higher difficulty.

FIG. 8B shows a flowchart of an embodiment of a method of playing the non-trivia game at the fastest pace at a higher difficulty. The method 800B depicted in FIG. 8B differs from the method 800A of FIG. 8A by allowing players to roll only a single die when determining which question category from which to draw a question and answer card 402. Choosing to play according to the rules of method 800B may increase the difficulty of the non-trivia game because players may be forced to choose a question and answer card 402 from an unfamiliar question category.

Sample Question Cards

FIGS. 9A, 9B, and 9C shows a diagram of an embodiment of two sample question and answer card front sides and one backside from non-trivia question category one. Non-trivia question category one may contain questions about health and nutrition, as represented by the sample question and answer cards 402 in FIG. 9. In the lower corner of question and answer card front sides there may be identification for indicating the category of the question and answer card and the question number of the particular question and answer card. For example, FIG. 9B indicates the question and answer card 402 is question one from question category one. FIG. 9C indicates the question and answer card 402 is question number two from question category one.

FIGS. 10A, 10B, and 10C shows a diagram of an embodiment of two sample question and answer card front sides and one backside from non-trivia question category two. Non-trivia question category two may contain questions about math, science, and technology, as represented by the sample question and answer cards 402 in FIG. 10.

FIGS. 11A, 11B, and 11C shows a diagram of an embodiment of two sample question and answer card front sides and one backside from non-trivia question category three. Non-trivia question category three may contain questions about money and economics, as represented by the sample question and answer cards 402 in FIG. 11.

FIGS. 12A, 12B, and 12C shows a diagram of an embodiment of two sample question and answer card front sides and one backside from non-trivia question category four. Non-trivia question category four may contain questions about law, civics, and sociology, as represented by the sample question and answer cards 402 in FIG. 12.

Figures 13A, 13B, 13C:
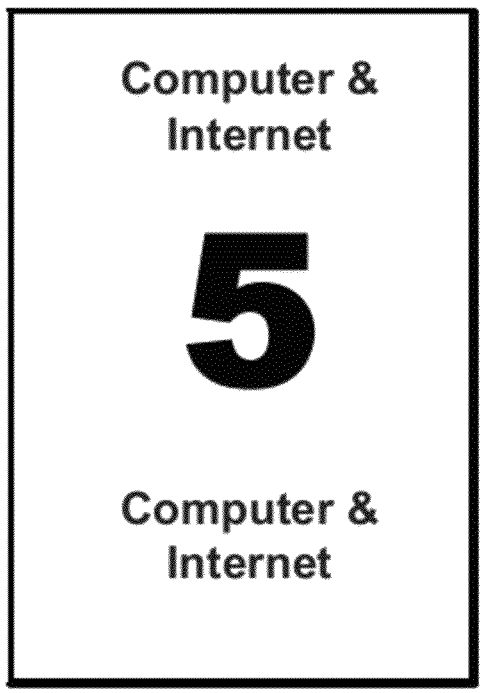
FIGS. 13A, 13B, and 13C show an embodiment of two sample question and answer card front sides and one backside from non-trivia question category five.

FIGS. 13A, 13B, and 13C shows a diagram of an embodiment of two sample question and answer card front sides and one backside from non-trivia question category five. Non-trivia question category five may contain questions about computers and the internet, as represented by the sample question and answer cards 402 in FIG. 13.

FIGS. 14A, 14B, and 14C shows a diagram of an embodiment of two sample question and answer card front sides and one backside from non-trivia question category six. Non-trivia question category six may contain questions about history and geography, as represented by the sample question and answer cards 402 in FIG. 14.

Instructions and Other Embodiments

FIGS. 15A and 15B show an embodiment of a set of sample instructions for playing the non-trivia game. The instructions, rules, and methods for playing the non-trivia game at the fastest, slow, and slowest paces with different difficulties may be contained and described in an included set of human readable media. The human readable media may be in any format that may be read and comprehended by a person. For example, as shown in FIGS. 15A and 15B, the human readable media may be in the form of instructions printed on paper (e.g., on a single sheet of booklet). In other embodiments, the instructions may be printed on cardboard (e.g., on the box cover or an instructions card), or plastic, among other materials. The instructions may be printed on a single sheet, a booklet, the inside or outside of a box cover, or an instructions card. The human readable media may also be in the form of a text or document stored electronically on a computer readable media that may be read on a computer. For example, the rules and methods may be stored on a compact disc (e.g., read only memory (CD-ROM)), included with the game, or stored on a computer readable medium stored on a server, available for reading over a network. Alternatively, the rules and methods may be available for download from a website maintained by the game manufacturer.

Figure 16:
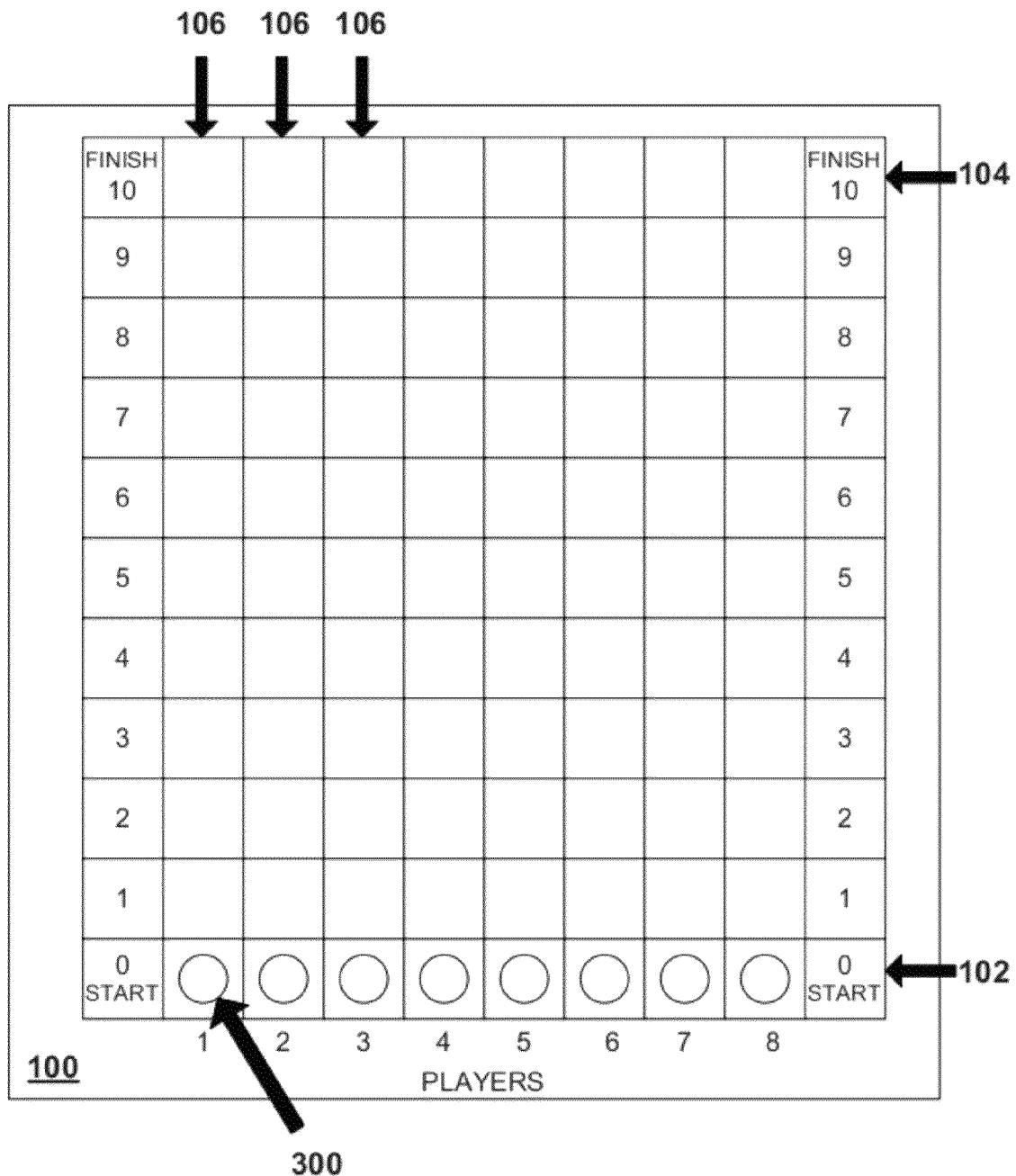
FIG. 16 shows a diagram of an alternative embodiment of a playing board used for tracking the progress of players from a starting line toward a finish line.

FIG. 16 shows a diagram of an alternative embodiment of a playing board 100 used for tracking the progress of players from a starting line toward a finish line. The playing board 100 of FIG. 16 has an indicated start and finish line printed on the board. Additionally, the playing board of FIG. 16 also has numbers printed along each outer playing lane to allow players to better track their progress through the game. FIG. 16 also depicts a full complement of player tokens 300 at the starting line. Similar to the playing board 100 of FIG. 1, the playing board 100 of FIG. 16 may contain more lanes to accommodate additional players. In an embodiment, playing board 100 may contain additional spaces to between the starting line and finish line.

FIG. 17 shows a diagram of an alternative embodiment of two sample question and answer card front sides and one backside from non-trivia question category one. The sample backside of FIG. 17 differs from the sample backside of FIG. 9 by having a category number and category description printed on each question and answer card such that players seated across from each other at a table may both read the question and answer card.

Figure 18:
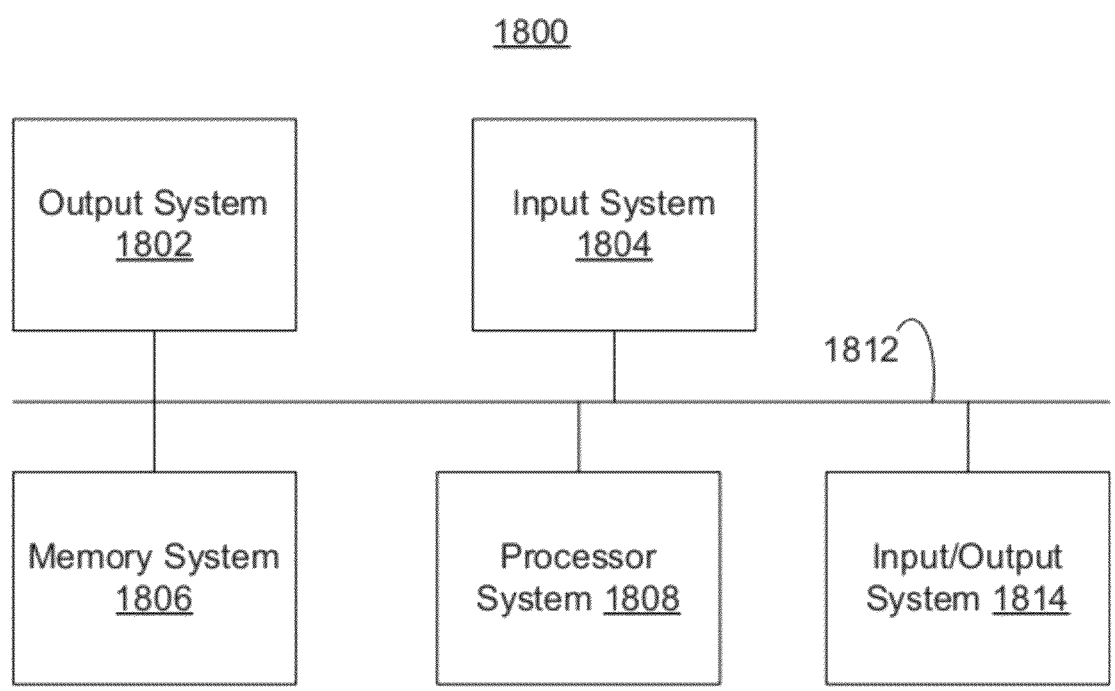
FIG. 18 shows a block diagram of a computer used for playing the non-trivia game in electronic form.

FIG. 18 shows a block diagram of a computing device 1800 used for playing the non-trivia game in an electronic form. The computing device may include output system 1802, input system 1804, memory system 1806, processor system 1808, communications system 1812, and input/output device 1814. In other embodiments, computing device 1800 may not have all of the components listed and/or may have other elements instead of, or in addition to, those listed above.

In an embodiment, the computing device 1800 may be a desktop computer. In another embodiment, the computing device 1800 may be a portable laptop or netbook computer. In yet another embodiment, the computing device 1800 may be a smartphone, a PDA, a gaming console, or a portable gaming system, among other things. In an embodiment, more than one computing device 1800 may be used in a client-server arrangement that may allow players to connect remotely and play the electronic version of the non-trivia game over a network, intranet, and/or wirelessly. In an embodiment, the electronic version of the non-trivia game may be implemented in an Internet environment, with players using a web-browsing program on a computing device 1800 to play the electronic version of the non-trivia game.

Output system 1802 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for playing the electronic version of the non-trivia game.

Input system 1804 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for playing an electronic version of the non-trivia game.

Memory system 1806 may include, for example, any one of, some of, any combination of, or all of a long term storage system, such as a hard drive; a short term storage system, such as random access memory; a removable storage system, such as a floppy drive or a removable drive; and/or flash memory. Memory system 1806 may include one or more machine readable mediums that may store a variety of different types of information. The term machine-readable medium is used to refer to any medium capable of carrying information that is readable by a machine. One example of a machine-readable medium is a computer-readable medium.

Memory system 1806 may contain a set of instructions or software, which when processed by the processor system 1808, may cause the computing device 1800 to display and execute an electronic version of the non-trivia game. In an embodiment, players may use the input system 1804 and output system 1802 of computer 1800 to play the electronic version of the non-trivia game.

Processor system 1808 may include any one of, some of, any combination of, or all of multiple parallel processors, a single processor, a system of processors having one or more central processors and/or one or more specialized processors dedicated to specific tasks for playing an electronic version of the non-trivia game. Also, processor system 1808 may include one or more Digital Signal Processors (DSPs) in addition to or in place of one or more Central Processing Units (CPUs) and/or may have one or more digital signal processing programs that run on one or more CPU.

Communications system 1812 communicatively links output system 1802, input system 1804, memory system 1806, processor system 1808, and/or input/output system 1814 to each other. Communications system 1812 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 1814 may include devices that have the dual function as input and output devices for playing the electronic version of the non-trivia game. For example, input/output system 1814 may include one or more touch sensitive screens, which display images for the non-trivia game and therefore are an output device and accept input, such as answer selection, when the screens are pressed by a finger or stylus, for example. The touch sensitive screens may be sensitive to heat and/or pressure. One or more of the input/output devices may be sensitive to a voltage or current produced by a stylus, for example. Input/output system 1814 is optional, and may be used in addition to or in place of output system 1802 and/or input device 1804.

FIG. 19 shows an alternative embodiment of a sample question and answer card front side from non-trivia question category one. The sample front side of FIG. 19 differs from the sample front side of FIG. 9 and FIG. 17 by having a lower portion of the question and answer card front side contain further sources of information about the answer. For example, in an embodiment, the lower portion of the question and answer card front side may have a section for further study, references, and/or links. The section for further study, references, and/or links may contain bibliographical information for books, references, and/or Internet links containing detailed information about the answer. In an electronic embodiment of the non-trivia game, the bibliographical information for books, references, and/or Internet links may be in hypertext transfer protocol format and may allow the player to be taken directly to the detailed information and/or an online vendor where the reference may be purchased.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A game comprising:
a set of cards, each card having at least one question and at least one answer about information that is useful in life, the set of questions on the card are not predominantly about one course of study or one job;
the set of cards having at least one subset of cards for each of a plurality of categories;
a sleeve for placing a card, the sleeve having a window for viewing content;
wherein the set of cards have answers hidden within background markings of a polarization different from the answer, the window having a polarization filter filtering out light based on a polarization of the light, the answer becoming visible, as a result filtering the polarization of light, when the card is placed in the sleeve and viewed, via the polarization of the filter;
a card container having at least card compartments and finger wells, the finger wells being located on opposite sides of the card compartments, the finger wells including at least one wall that is a part of the card container, the at least one wall of each finger well forming a space large enough to fit a finger between the at least one wall and the cards while the cards are in the card compartment, each finger well is adjacent a card compartment and each finger well is open on one side of the finger well, the side of the finger well that is open is to adjacent the card compartment, the side of the finger well that is adjacent to the card compartment does not have any wall between the finger well and the card compartment;
a pair of dice for determining a category;
a playing board having a plurality of lanes for tokens; and
a plurality of tokens, including at least one token for each lane.

2. The game of claim 1, each card of the set of cards having an indicator of which of the at least one answers is correct.

3. The game of claim 2, further comprising a sheet for carrying playing instructions, which includes a selectable choice of instructions to advance a token of a user that answers a question correctly;
the selected choice of instructions including choices for faster or slower game play;
the selectable choice of instructions further including choices for more than one difficulty of play;
the selectable choice of instructions including selecting which categories are available for an entire game, based on a roll of at least one die.

4. The game of claim 3, further comprising a set of playing instructions contained on a human readable media, where the instructions include:
determining a player to take a current turn;
determining a category of a question to be asked of the player;
drawing a card from the category, the card having at least one question that tests the player's knowledge of a subject that is useful and relevant in life; and
if the player answers correctly, advancing a token on a playing board, the questions not being focused around any particular course of study or job training.

5. The game of claim 4, the set of cards being marked on at least one side with at least category information, the category information having at least two different regions, the regions having opposite orientations from one another.

6. The game of claim 5, each card having at least a detailed description of the answer for more depth of knowledge and understanding of a subject.

7. The game of claim 1, the playing board having an indicated start line opposite, and parallel to, an indicated finish line, the start line having labels for each of the lanes for tokens, and progress labels marking at least an outer border outside of an outer lane; the progress labels mark progress of tokens moving from the start line to the finish line.

8. A game comprising:
dice for determining a category;
a set of cards, each card having at least one question and at least one answer about information that is useful in life, the set of questions on the card are not predominantly about one course of study or one job, the set of cards having at least one subset of cards for each of a plurality of categories, the category determining by the dice being one of the set of categories from which a card is selected;
a sleeve for placing a card, the sleeve having a window for viewing content;
wherein the set of cards have answers hidden within background markings of a polarization different from the answer, the window having a polarization filter filtering out light based on a polarization of the light, the answer becoming visible as a result filtering the polarization of light when the card is laced in the sleeve and viewed, via the polarization of the filter;
a card container having at least card compartments and finger wells, the finger wells being located on opposite sides of the card compartments, the finger wells including at least one wall that is a part of the card container, the at least one wall of each finger well forming a space large enough to fit a finger between the at least one wall and the cards while the cards are in the card compartment, each finger well is adjacent a card compartment and each finger well is open on one side of the finger well, the side of the finger well that is open is to adjacent the card compartment, the side of the finger well that is adjacent to the card compartment does not have any wall between the finger well and the card compartment;
a playing board having a plurality of lanes; and
a plurality of tokens for advancing on the playing board if the question is answered correctly, including at least one token for each lane and player, the plurality of tokens including one token that is advanced if a player having the token answers the question correctly.

9. A game comprising:
a set of cards, each card having at least one question and at least one answer about information that is useful in life, the set of questions on the card are not predominantly about one course of study or one job;
the set of cards having at least one subset of cards for each of a plurality of categories;
a pair of dice for determining a category;
a playing board having a plurality of lanes for tokens;
a plurality of tokens, including at least one token for each lane;
a sleeve for placing a card, the sleeve having a window for viewing content;
wherein the set of cards have answers hidden within background markings of a polarization different from the answer, the window having a polarization filter filtering out the background markings and filtering out light based on a polarization of the light, the answer becoming visible, as a result filtering the polarization of light, when the card is placed in the sleeve and viewed via the polarization of the filter;
wherein each card of the set of cards has an indicator of which of the at least one answers is correct;
wherein the game further includes a sheet for carrying playing instructions, which includes a selectable choice of instructions to advance a token of a user that answers a question correctly;
the selected choice of instructions including choices for faster or slower game play;
the selectable choice of instructions further including choices for more than one difficulty of play;
the selectable choice of instructions including selecting which categories are available for an entire game, based on a roll of at least one die;
wherein the game further includes a set of playing instructions contained on a human readable media, where the instructions include:
determining a player to take a current turn;
determining a category of a question to be asked of the player;
drawing a card from the category, the card having at least one question that tests the player's knowledge of a subject that is useful and relevant in life; and
if the player answers correctly, advancing a token on a playing board, the questions not being focused around any particular course of study or job training;
wherein the set of cards are marked on at least one side with at least category information, the category information having at least two different regions, the regions having opposite orientations from one another;
wherein each card has at least a detailed description of the answer for more depth of knowledge and understanding of a subject;
wherein the game further includes a card container having at least card compartments and finger wells, the finger wells being located on opposite sides of the card compartments, the finger wells including at least one wall that is a part of the card container, the at least one wall of each finger well forming a space large enough to fit a finger between the at least one wall and the cards while the cards are in the card compartment, each finger well is adjacent a card compartment and each finger well is open on one side of the finger well, the side of the finger well that is open is to adjacent the card compartment, the side of the finger well that is adjacent to the card compartment does not have any wall between the finger well and the card compartment;
wherein the playing board has
an indicated start line opposite, and parallel to, an indicated finish line,
the start line having labels for each of the lanes for tokens, and
progress labels marking at least an outer border outside of an outer lane;
the progress labels mark progress of tokens moving from the start line to the finish line; and
wherein each of the lanes for token are straight and identical to each other.

* * * * *